United States Patent

Scheffer

[11] Patent Number: 6,086,080
[45] Date of Patent: Jul. 11, 2000

[54] BICYCLE FRAME

[75] Inventor: Lutz Scheffer, Pforzheim, Germany

[73] Assignee: Dr. Ing. h.c.F. Porsche AG, Weissach, Germany

[21] Appl. No.: 08/939,647

[22] Filed: Sep. 29, 1997

[30] Foreign Application Priority Data

Sep. 27, 1996 [DE] Germany .............................. 196 39 765

[51] Int. Cl.[7] .................................................. B62K 3/02
[52] U.S. Cl. ............................................................ 280/283
[58] Field of Search ............................... 280/283, 281.1, 280/274, 284

[56] References Cited

U.S. PATENT DOCUMENTS

| | | | |
|---|---|---|---|
| 3,982,770 | 9/1976 | Satoh et al. | 280/284 |
| 4,046,396 | 9/1977 | Taylor et al. | 280/281 |
| 5,201,537 | 4/1993 | D'Aluisio | 280/281.1 |
| 5,685,553 | 11/1997 | Wilcox et al. | 280/283 |
| 5,725,227 | 3/1998 | Mayer | 280/284 |

FOREIGN PATENT DOCUMENTS 296 03 546  5/1996  Germany .

OTHER PUBLICATIONS

Radmarkt–Forum '94, Jul. 1994, p. 8.
Radfahren, Jun. 1995, p. 18.
Dieren, Gazelle, Produktion Läuft auf Hochtouren, Rad-Markt, Jan. 1996, p. 29.

*Primary Examiner*—Paul N. Dickson
*Assistant Examiner*—Avraham H. Lerner
*Attorney, Agent, or Firm*—Evenson, McKeown, Edwards & Lenahan, P.L.L.C.

[57] ABSTRACT

A bicycle frame is provided with a steering tube, a saddle tube, a top tube and an inclined tube as well as a fork for a front wheel held on the steering tube and another fork or swing unit for a rear wheel as well as a pedal bearing unit held on the frame. The top tube has a forward first tube section fastened to the steering tube and connected with a second saddle tube section fastened on the saddle receiving tube. The forward tube section may comprise an elongated tube part of the inclined tube and, between the sections and the inclined tube, has a junction in a plane below the connection of the saddle tube section on the saddle receiving tube and the connection of the additional tube section on the steering tube.

20 Claims, 4 Drawing Sheets

BICYCLE FRAME

BACKGROUND AND SUMMARY OF THE INVENTION

This application claims the priority of German patent document 196 39 765.0, the disclosure of which is expressly incorporated by reference herein.

The invention relates to a bicycle frame, and more particularly to a bicycle frame including a steering receiving member, a saddle receiving member, a top member, and an inclined member.

From D'Aluisio, U.S. Pat. No. 5,201,537, a bicycle frame is known which, on the one hand, forms an open triangle between a forward top tube, a section of an inclined tube and a section of a rearward top tube and, on the other hand, forms another triangle between the top tube, a saddle tube and an inclined tube. A forward fork for a front wheel is linked to a steering tube of the frame and a rearward rocker or fork for a rear wheel is linked to the saddle tube and an inclined tube.

It is an object of the invention to provide a bicycle frame which comprises a base frame from which variably designed bicycle frames can be produced and the bicycle frame can be assembled in a simple manner from a few frame tubes and is to be particularly suitable for a fully shock-mounted bicycle.

This and other objects have been achieved according to the present invention by providing a bicycle frame, comprising: a steering receiving member; a saddle receiving member; a top member comprising a forward section which is connected to the steering receiving member and a rearward section which is connected to the saddle receiving member; and an inclined member extending between said top member and a pedal bearing unit, a junction existing between the forward and rearward sections and the inclined member in a horizontal plane located below each of a connection of the rearward section to the saddle receiving member and a connection of the forward section to the steering receiving member.

This and other objects have been achieved according to the present invention by providing a bicycle frame, comprising: a steering receiving member; a saddle receiving member; a top member comprising a forward section which is connected to the steering receiving member and a rearward section which is connected to the saddle receiving member; an inclined member extending between said top member and a pedal bearing unit; and at least one junction plate extending between the inclined member and the top member proximate a junction between the forward section and the rearward section.

This and other objects have been achieved according to the present invention by providing a method of manufacturing a bicycle frame having a steering receiving member, a saddle receiving member, a top member comprising a forward section and a rearward section and an inclined member, said method comprising the steps of: connecting said forward section of the top member to the steering receiving member; connecting said rearward section of the top member to the saddle receiving member; arranging said inclined member to extend between said top member and a pedal bearing unit; and arranging and interconnecting said forward section, said rearward section and said inclined member such that a junction is formed therebetween in a horizontal plane located below each of a connection of the rearward section to the saddle receiving member and a connection of the forward section to the steering receiving member.

Advantages achieved by the present invention are that the frame consisting of several assembled tubes, on the one hand, has a basic stability as well as a dynamic stability during compression operations. Thus, for example, the top tube is formed of a forward tube section, which is part of an inclined tube, and of a saddle tube section. A connection of the tubes in a junction close to a support bearing for a shock absorber or spring damper unit results in a stable support base for the rear swing unit which can be swivelled about a pivot in the area of the chain wheel (sprocket) in the pedal bearing.

The tube sections of the top tube are arranged angularly with respect to one another which results in a favorable entry section with a low-lying junction which is situated below the connection points on the saddle receiving tube and on the steering tube in order to enable easier mounting by a rider.

The constructions of a frame preferably have a saddle tube which projects toward the rear from the inclined tube and which in various constructions is reinforced in the area of the junction by way of metal plates or the like. The saddle tube section or the saddle tube receiving section can also be reinforced by means of a downwardly directed strut or fork which is supported on the inclined strut and which between one another accommodate the shock absorber unit or has a space for guiding through the shock absorber unit.

So that a stability of the frame is ensured despite a filigree linking of the saddle tube section to the inclined tube, reinforcements are provided either on the underside of the saddle tube section at least along a partial length or are arranged additionally in the junction on the top side of the meeting tubes of the saddle tube and of the forward tube section of the top tube.

According to another construction of the frame according to the invention, the tube sections of the top tube form a Y-shaped frame with the diagonal strut. As a result, a stable connection is achieved in that the two tube sections of the top tube in the bent area are supported by the inclined tube. This inclined tube directly its face meets the connection points of the two tube sections. The three tubes can be connected with one another via a welded connection. The forming junction is situated approximately in the center between the front wheel and the rear wheel.

So that an optimized connection can be achieved in the junction of the three tubes with respect to the length of the weld seams, the tube ends virtually overlap such that relatively long weld seams are formed and therefore also connections and supporting surfaces with respect to one another.

An additional support between the saddle tube section and the inclined tube takes place by means of an interposed connection console which simultaneously forms a support bearing for the shock absorber. Furthermore, additional reinforcing metal plates may be provided below the tube, for example, in the tube center plane.

According to a further development of the invention, the frame has a sheet metal or casting support with respect to the inclined tube in the junction of the tube section of the saddle tube and of the forward top tube. This support may be perforated or be provided with recesses having geometrical shapes, in which case the support simultaneously forms a bearing for the shock absorber.

Because of the frame parts which form a kit and have the same connection points, the swing unit can be inserted into any frame according to the constructions.

Other objects, advantages and novel features of the present invention will become apparent from the following

DETAILED DESCRIPTION OF THE DRAWINGS

Figure 1:
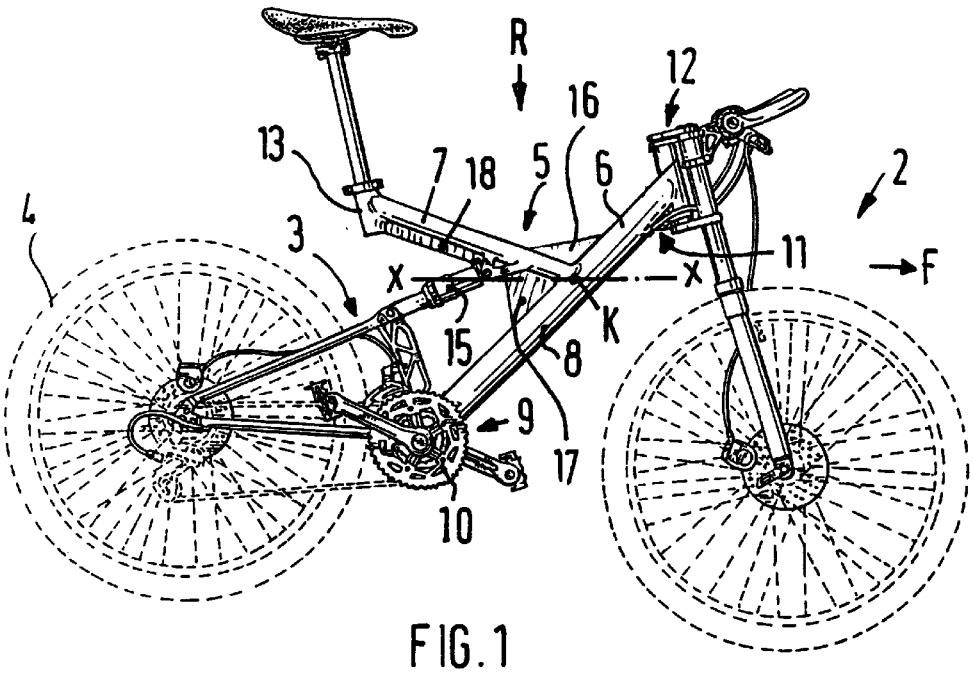
FIGS. 1 to 3 are lateral views of frames for a bicycle having a saddle tube section projecting away from a forward tube section according to preferred embodiments of the present invention.
Figure 2:
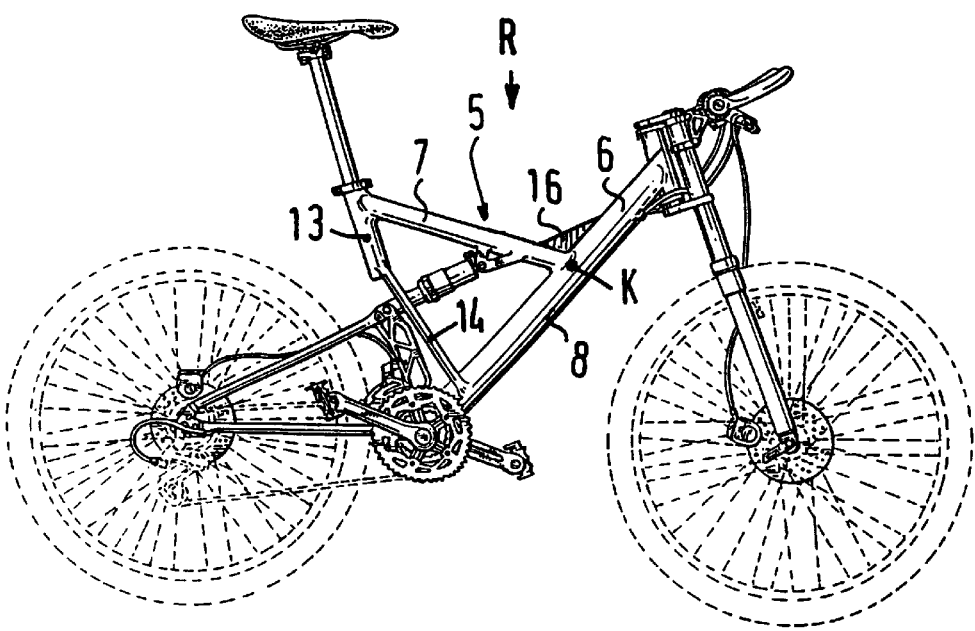
Figure 3:
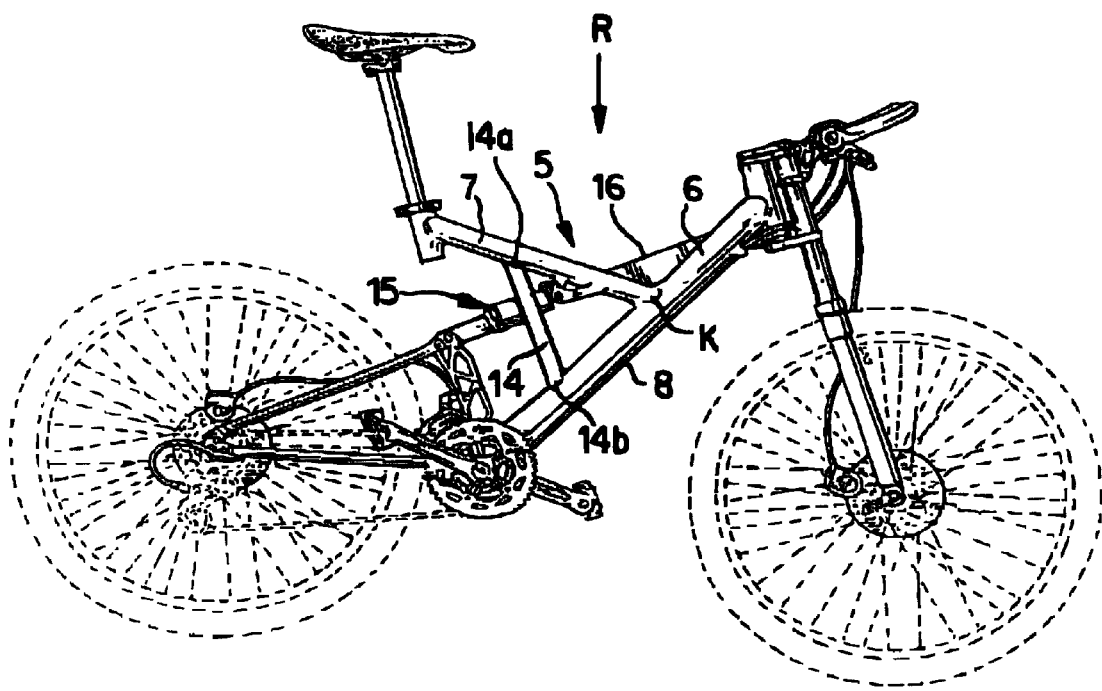

Referring to FIGS. 1–3, a frame R, R1, R2 of a bicycle 2, particularly having a swinging unit for a rear wheel, comprises essentially a top tube or top member 5 consisting of a first forward tube section 6 and a second rearward saddle tube section 7, viewed in the travelling direction F of the bicycle.

The forward tube section 6 may be an extension of an inclined tube or inclined member 8 which has the pedal bearing unit 10 at the lower end 9 and which is connected with the steering tube or steering receiving member 12 on the upper end 11 which faces away, as illustrated in the embodiments according to FIGS. 1 to 3.

Between the tube sections 6 and 7 and the inclined tube 8, a junction K is formed which, because of the tube sections 6, 7 arranged at an angle with respect to one another, is situated in a plane X—X below the connection points of the tube sections on the saddle tube receiving member 13 a nd the steering tube 12.

The term "member" used herein in reference to the frame members 5, 6, 7, 8, 12 and 13 is intended to cover the contemplated use of non-tubular, e.g. solid cross-section, frame members.

For the purpose of a linking to the inclined tube 8, the saddle tube section 7 projecting away toward the rear is provided with a supporting strut 14 which may be connected approximately in the center of the saddle tube section 7 at reference number 14a and approximately on the end side of the inclined strut 8 at reference number 14b as shown in FIG. 3. The support 14 has a fork-shaped construction so that the shock absorber or spring damper unit 15 can be guided through.

As illustrated in the embodiments according to FIGS. 1 to 3, a triangular reinforcing metal plate 16 is arranged on the top side in the area of the meeting tube sections 6, 7. In addition, in the meeting area between the saddle tube section 7 and the inclined tube 8, a reinforcing metal plate 17 may also be arranged which is continued at a reduced width as a web plate 18 to the saddle receiving tube 13.

The support 14 can also directly adjoin the saddle receiving tube 13 and be supported on the inclined tube 8.

Figure 4:
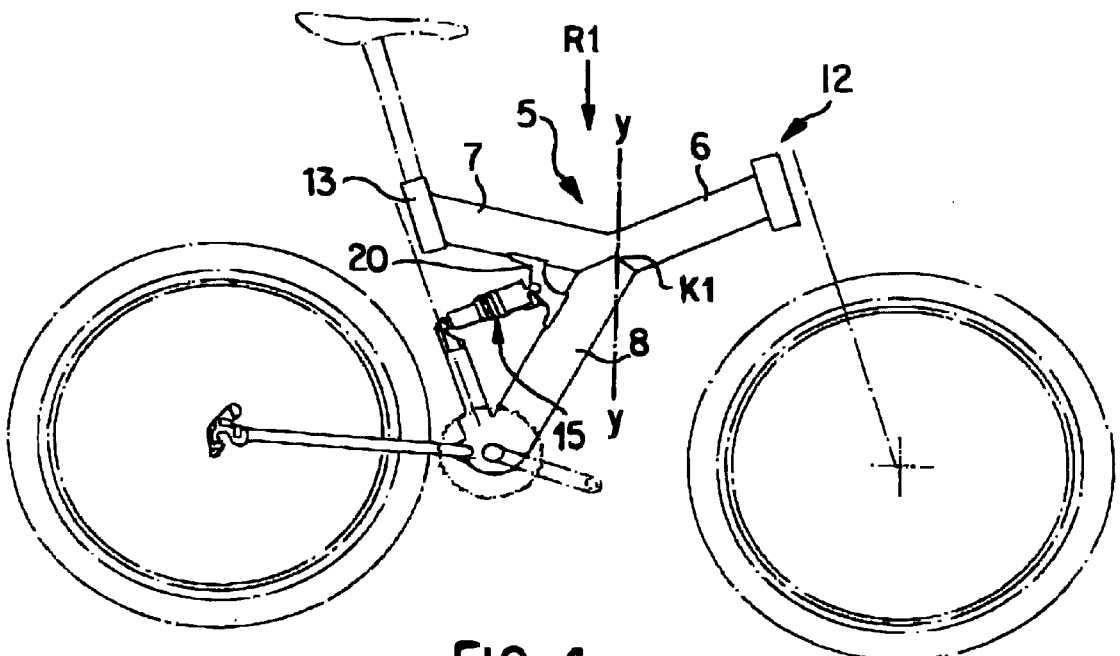
FIGS. 4 and 5 are lateral views of a frame for a bicycle having a Y-shaped development.
Figure 5:
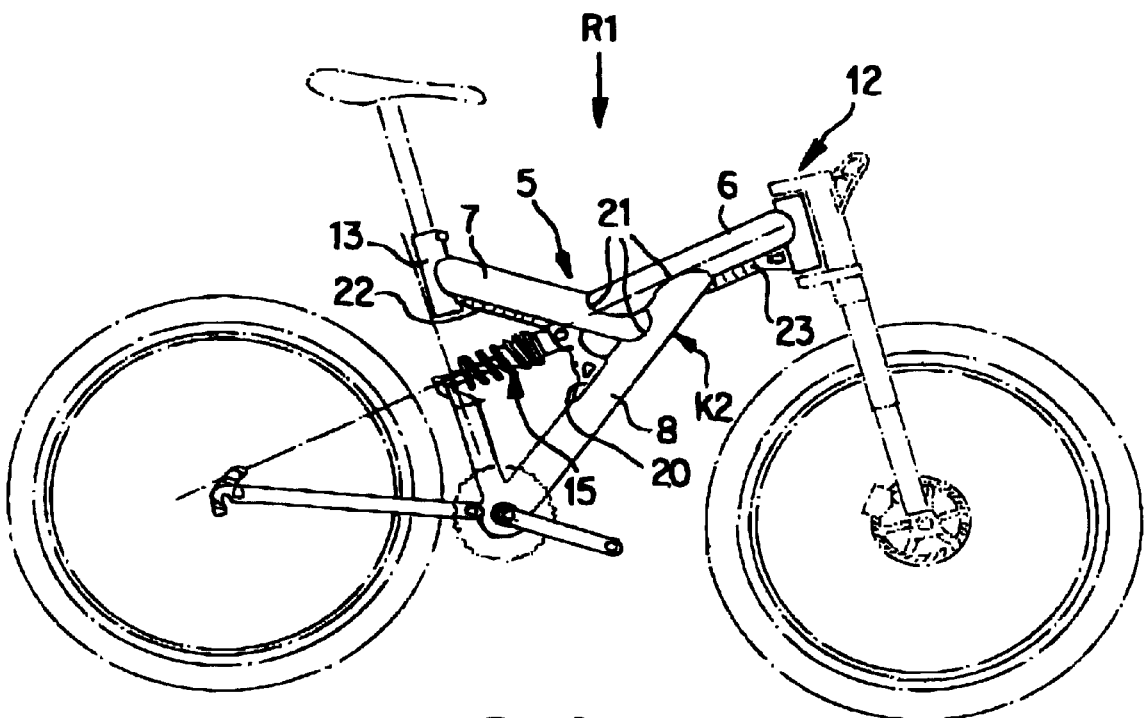

According to another embodiment of FIGS. 4 and 5, the frame sections 6 and 7 together with the inclined tube 8 form a Y-shaped frame R1. The tube sections 6 and 7 of the top frame, which are situated at an angle relative to one another, are connected with one another in the junction K1 by a welding. The junction K1 is situated approximately in the center between the front wheel and the rear wheel in a plane Y—Y.

In the corner area between the tube section 7 and the inclined tube 8, a connection console 20 is provided which simultaneously forms a support bearing for the shock absorber 15.

According to the embodiment of FIG. 4, the junction K1 is formed by directly abutting tube ends 6, 7, 8 so that relatively short connection surfaces are obtained. In contrast, according to FIG. 5, the connection surfaces 21 between the tube ends can be constructed to be relatively long because of an overlapping tube arrangement at junction K2.

For reinforcing the frame 5, additional reinforcing webs 22, 23 may be provided below the saddle tube sections 7 and the tube section 6.

Figure 6:
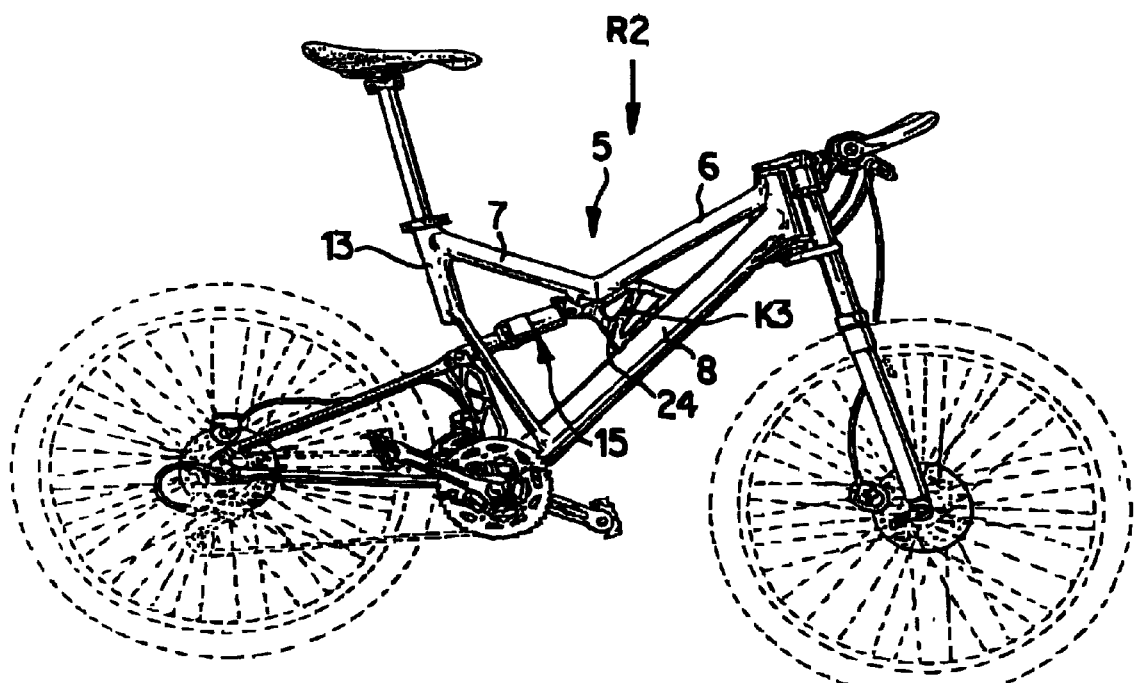
FIGS. 6 and 7 are lateral views of a frame for a bicycle having top frames which are angularly arranged with respect to one another and having an interposed reinforcing metal plate.
Figure 7:
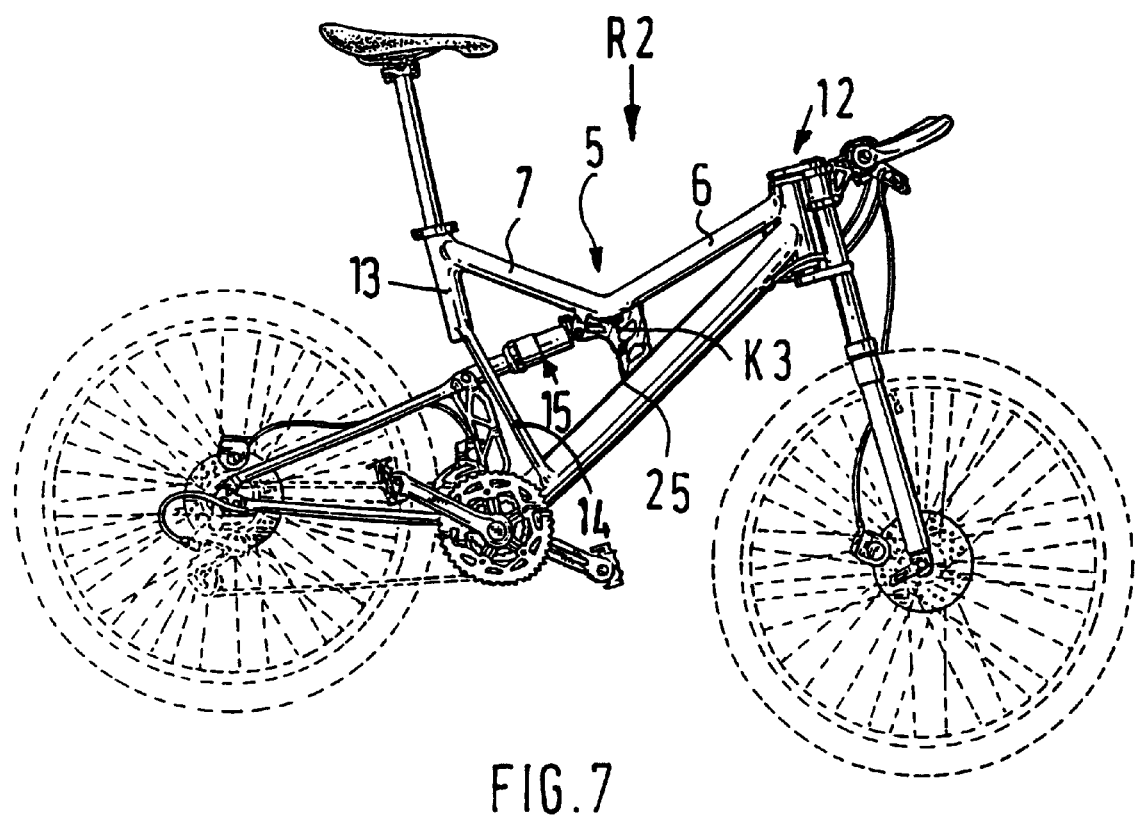

In the embodiment of the frame R2 according to FIGS. 6 and 7, the tube sections 6, 7, which are arranged at an angle with respect to one another, are supported in the junction K3 by junction plates 24 and 25 which extend between the tube 5's, 6, 7 and the inclined tube 8. These junction plates 24, 25 are preferably provided with openings. The supporting of the shock absorber 15 can take place between two reinforcing plates 24 and 25 arranged in parallel.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A bicycle frame, comprising:
   a steering receiving member;
   a saddle receiving member;
   a top member comprising a forward section which is connected to the steering receiving member and a rearward section which is connected to the saddle receiving member;
   an inclined member extending between said steering receiving member and a pedal bearing unit, said forward section and said rearward section defining an obtuse angle such that a junction therebetween is located in a horizontal plane located below each of a connection of the rearward section to the saddle receiving member and a connection of the forward section to the steering receiving member; and
   at least one non-tubular junction plate extending between the inclined member and the top member proximate said junction.

2. A bicycle frame according to claim 1, wherein said at least one junction plate defines at least one opening.

3. A bicycle frame according to claim 1, wherein a support bearing for a shock absorber is provided on said at least one junction plate.

4. A bicycle frame according to claim 1, wherein said top member is spaced at a distance from said inclined member.

5. A bicycle frame according to claim 1, wherein two of said junction plates are arranged in parallel such that a shock absorber can be supported therebetween.

6. A bicycle frame according to claim 1, wherein said forward section of said top member, said rearward section of said top member, and said inclined member each consist of a single tubular member.

7. A bicycle frame according to claim 1, wherein at least a portion of said at least one junction plate is located along an axial extension of said rearward section of the top member.

8. A bicycle frame according to claim 1, wherein at least a portion of said at least one junction plate is located parallel to said rearward section of the top member.

9. A bicycle frame according to claim 1, further comprising a shock absorber coupled to said at least one non-tubular junction plate, said shock absorber being arranged at least approximately coaxially with said forward section of the top member.

10. A bicycle frame according to claim 9, further comprising a shock absorber coupled to said at least one non-tubular junction plate, said shock absorber being arranged at least approximately coaxially with said forward section of the top member.

11. A bicycle frame, comprising:

a steering receiving member;

a saddle receiving member;

a top member comprising a forward section which is connected to the steering receiving member and a rearward section which is connected to the saddle receiving member, said forward section and said rearward section defining an obtuse angle;

an inclined member extending between said steering receiving member and a pedal bearing unit; and at least one non-tubular junction plate extending between the inclined member and the top member proximate a junction between the forward section and the rearward section.

12. A bicycle frame according to claim 11, wherein said at least one junction plate defines at least one opening.

13. A bicycle frame according to claim 11, wherein a support bearing for a shock absorber is provided on said at least one junction plate.

14. A bicycle frame according to claim 11, wherein said top member is spaced at a distance from said inclined member.

15. A bicycle frame according to claim 11, wherein two of said junction plates are arranged in parallel such that a shock absorber can be supported therebetween.

16. A bicycle frame according to claim 11, wherein said forward section of said top member, said rearward section of said top member, and said inclined member each consist of a single tubular member.

17. A bicycle frame according to claim 11, wherein at least a portion of said at least one junction plate is located along an axial extension of said rearward section of the top member.

18. A bicycle frame according to claim 11, wherein at least a portion of said at least one junction plate is located parallel to said rearward section of the top member.

19. A bicycle frame according to claim 11, further comprising a shock absorber coupled to said at least one non-tubular junction plate, said shock absorber being arranged at least approximately coaxially with said forward section of the top member.

20. A bicycle frame according to claim 19, further comprising a shock absorber coupled to said at least one non-tubular junction plate, said shock absorber being arranged at least approximately coaxially with said forward section of the top member.

\* \* \* \* \*